Dec. 1, 1925.
W. H. SCHMIDT ET AL
HOIST FOR TRACTORS
Filed March 26, 1925
1,563,874
4 Sheets-Sheet 4
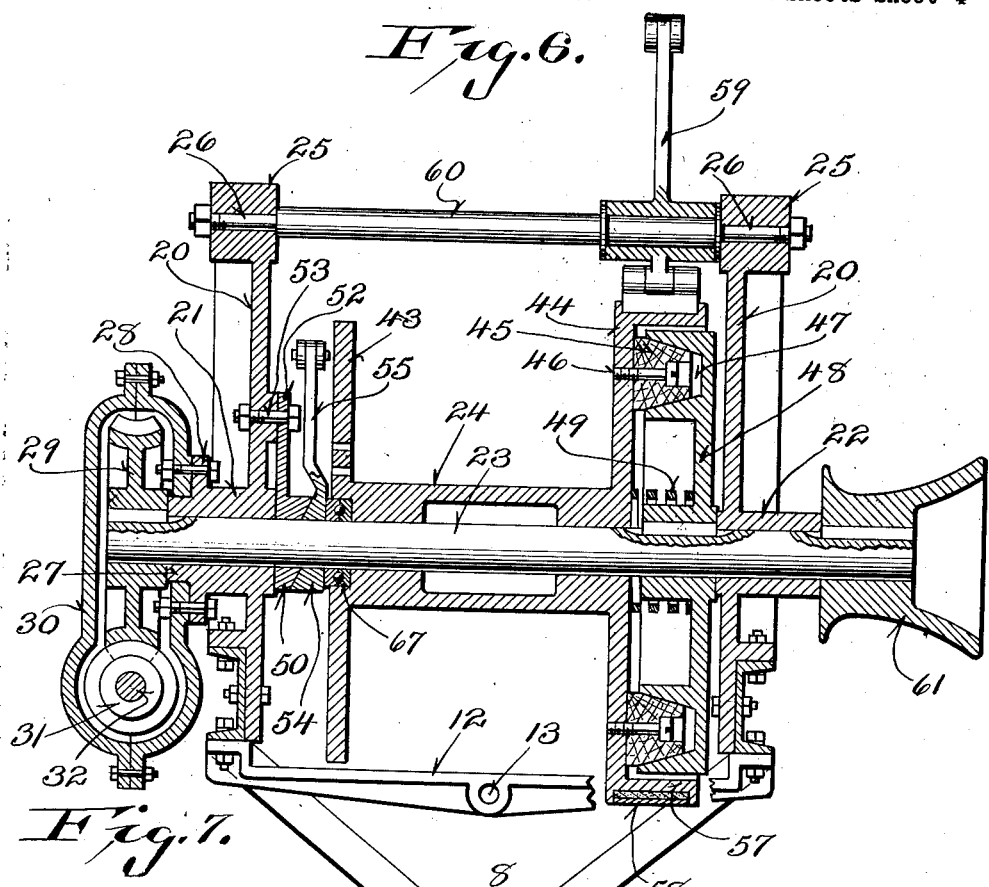
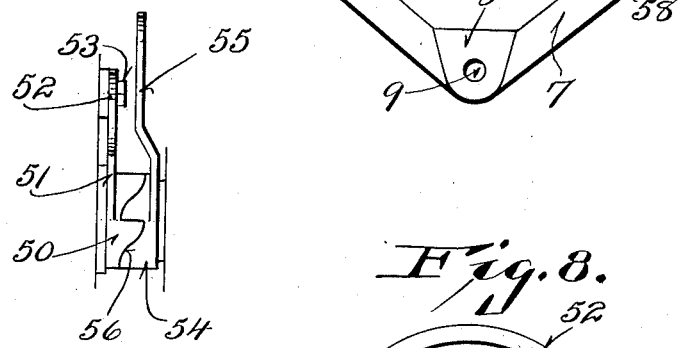
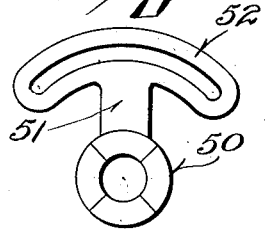
Inventors
W. H. Schmidt
P. O. Dallmann
T. G. Mueller Patented Dec. 1, 1925.

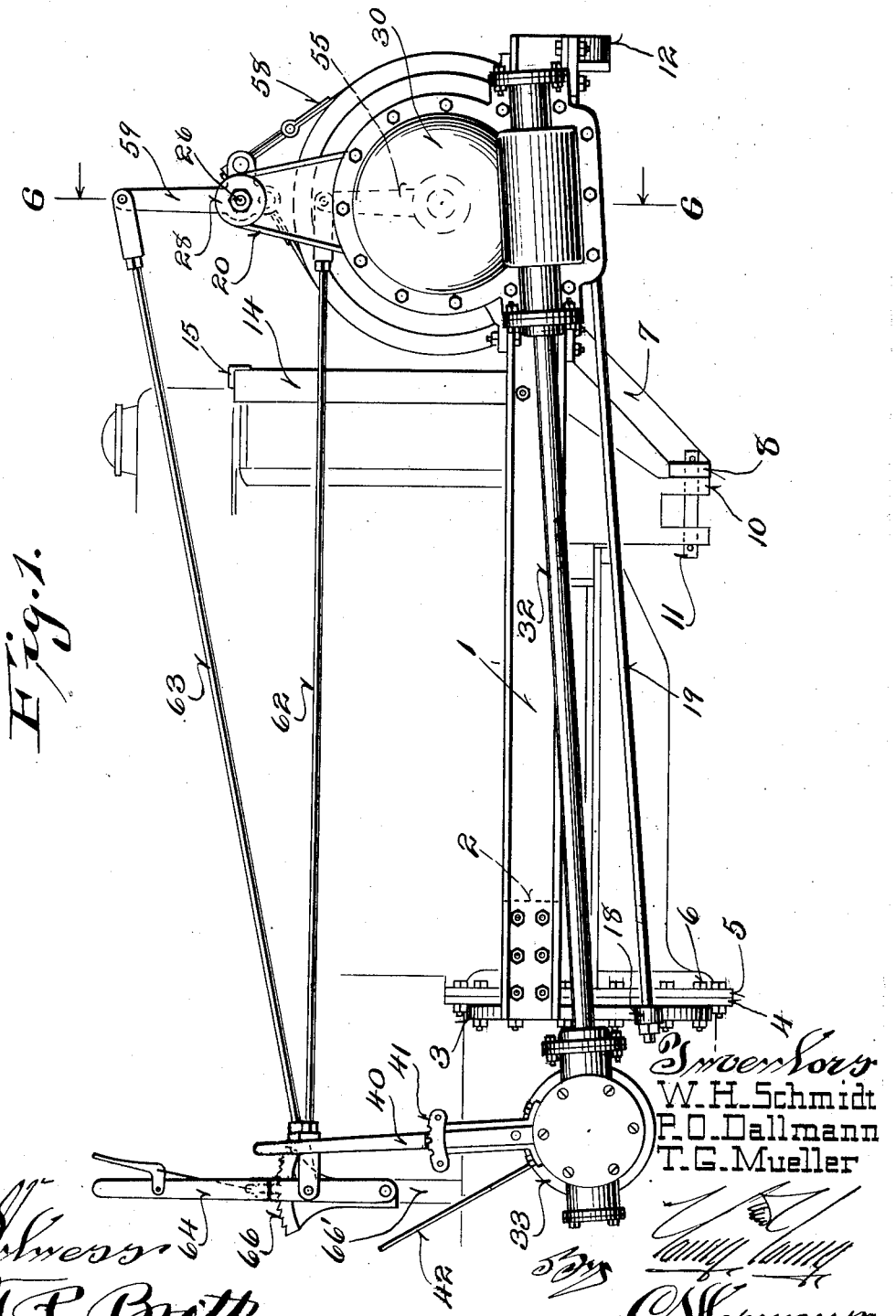

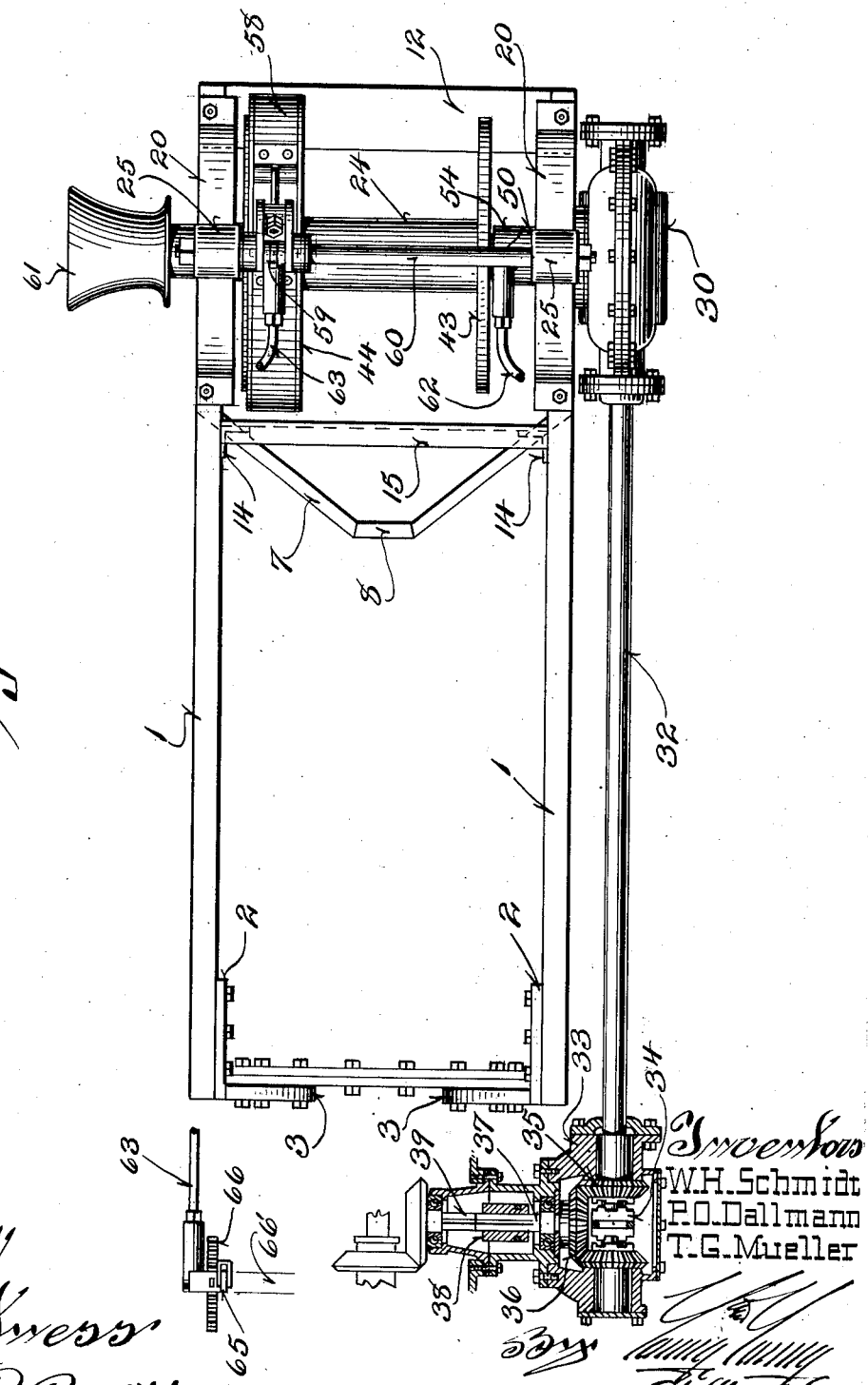

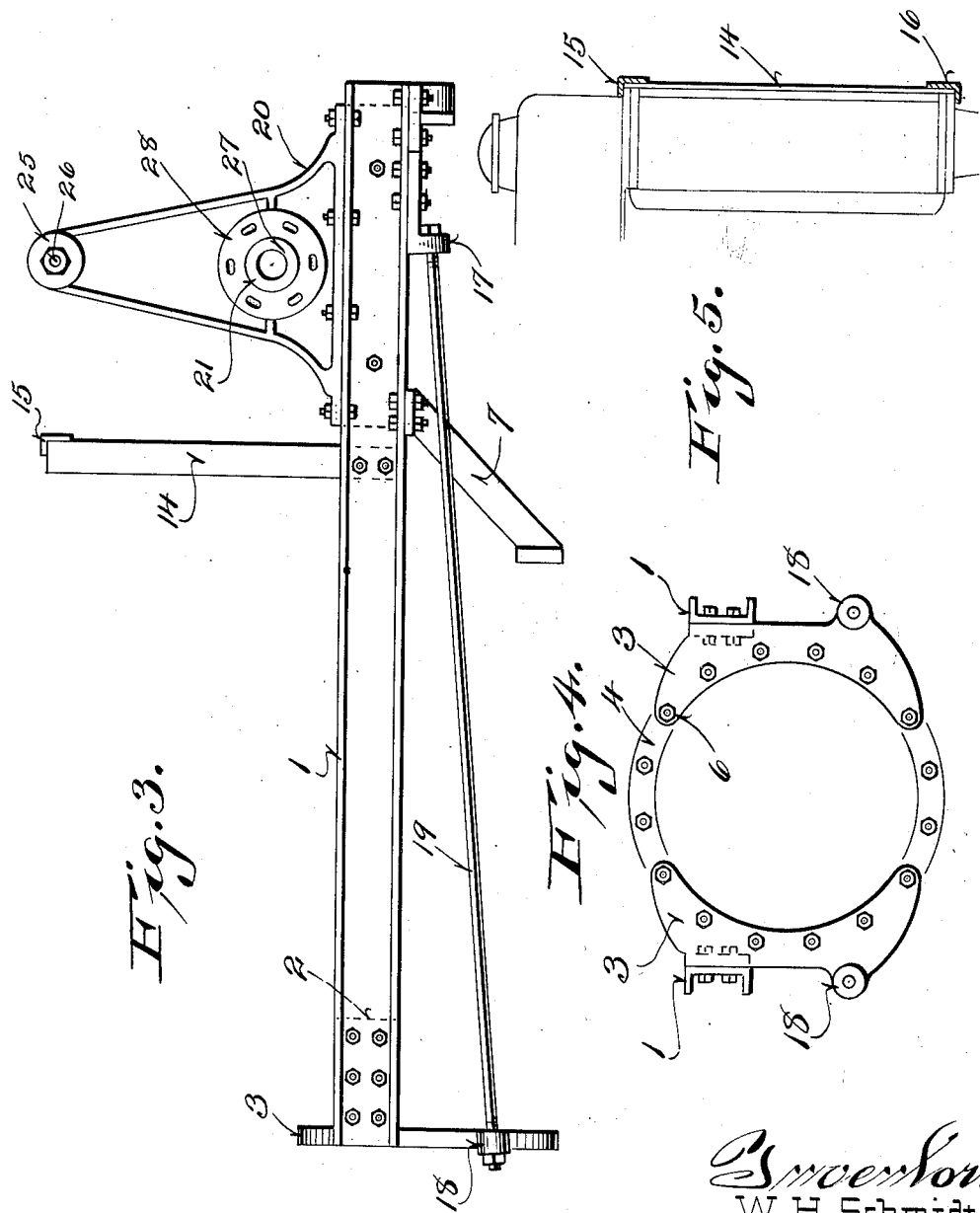

1,563,874

UNITED STATES PATENT OFFICE.

WILLIAM H. SCHMIDT, PAUL O. DALLMANN, AND THEODORE G. MUELLER, OF MILWAUKEE, WISCONSIN, ASSIGNORS TO DALLMANN MACHINE & MANUFACTURING CO., OF MILWAUKEE, WISCONSIN.

HOIST FOR TRACTORS.

Application filed March 26, 1925. Serial No. 18,404.

*To all whom it may concern:*

Be it known that we, WILLIAM H. SCHMIDT, PAUL O. DALLMANN, and THEODORE G. MUELLER, all citizens of the United States, and residents of Milwaukee, in the county of Milwaukee and State of Wisconsin, have invented certain new and useful Improvements in Hoists for Tractors; and we do hereby declare that the following is a full, clear, and exact description thereof.

This invention relates to hoists for tractors, and is particularly directed to a hoist adapted for attachment to a conventional form of tractor such for example as that known as the Fordson.

In hoists as previously constructed and used in connection with tractors difficulty has been experienced due to the inadvertent stalling of the engine when the load was suddenly applied and released from the brake.

This invention is designed to overcome the above noted defects, and objects of the invention are to provide a hoist attachment for a tractor which is so constructed that the load may be gradually released from the brake and gradually given to the engine, thus avoiding any possibility of stalling the engine, and to provide a tractor in which a friction clutch is provided between the load and the engine which has extensive bearing area and is adapted to handle a relatively large load without producing excessive wear or heating.

Further objects are to provide a hoist attachment for tractors which is of relatively simple construction and may be easily and quickly attached to a conventional tractor with a minimum of change and with very little effort, and to so construct the attachment that the longitudinal pull is transmitted to the strongest portion of the tractor, and in which the device is securely braced from, or attached to, the tractor in such a way that it forms a unitary structure with the tractor and yet is adapted to yield to accommodate yielding of the tractor.

Further objects are to provide a hoist attachment for a tractor which is also equipped with a winch head commonly known as a "cat head" which, although carried upon the shaft of the winding drum, can nevertheless be operated independently of the winding drum and even while the load is held by the brake, and to provide mechanism whereby either the winding drum or the winch head can be driven in either direction.

Further objects are to provide a hoisting attachment for tractors equipped with a friction clutch so constructed that provision is made for quickly and easily taking up wear of the clutch to thus provide a long life for the renewable clutch parts, and a uniform action thereof through their entire effective period irrespective of the wear caused by constant use.

Further objects are to provide a hoist attachment for tractors which is of simple and strong construction and of relatively light weight, and in which the controls are located within easy reach of the operator, thus permitting the operator to remain in the usual tractor seat and yet operate the hoisting mechanism effectively from such position.

An embodiment of the invention is shown in the accompanying drawings, in which:—

Figure 1 is a side elevation of the device.

Figure 2 is a plan view partly in section, of the structure shown in Figure 1.

Figure 3 is a side elevation of the frame of the device or body portion thereof as it appears when the movable mechanism is removed therefrom.

Figure 4 is an end view of the structure shown in Figure 3.

Figure 5 is a side view of the radiator showing in section the transverse angle irons and their relative position to the radiator.

Figure 6 is an enlarged transverse sectional view on the line 6—6 of Figure 1.

Figure 7 is a detail showing the clutch take-up.

Figure 8 is a further detail of one of the parts of the clutch take-up.

Referring to the drawings, it will be seen from Figures 1, 2, and 3 that the frame work or body portion of the device consists of a pair of longitudinally extending channel irons 1 whose rear ends are attached by means of bolts to extensions 2 of the segmental attaching members 3. These attaching members, as illustrated in the three figures noted are adapted to be positioned rearwardly of the flange 4 of the transmission case of tractors of the conventional type and to thus hook behind such flange and transmit the longitudinal stresses directly to the main body portion of the tractor. The segmental members 3 are provided with a plurality of apertures aligning with the apertures in the flange 4 of the transmission case and in the flange 5 of the crank case. A plurality of the usual bolts attaching these flanges are removed and slightly longer bolts, as indicated at 6, are passed through the aligning apertures thus securely attaching the segmental members 3 to the flange of the transmission case, while a plurality of the usual bolts are left untouched.

The forward portion of the longitudinally extending channel irons are supported by means of a V-shaped member provided with inwardly converging and downwardly extending arms 7, as shown most clearly in Figures 1, 2, 3 and 6. The central or common point of these arms is provided with a bearing member or thickened member 8 provided with an aperture 9 (see Figure 6). This aperture is adapted to align with the apertures in the front fork 10 (see Figure 1) of the tractor. The usual pin connecting this front fork with the front axle is removed and a slightly longer pin 11 is substituted therefor, as shown in Figure 1. Thus the forward portion of the channel members 1 or side frame bars of the hoist are securely supported from the front axle.

The extreme front ends of the channel irons 1 are joined by means of a connecting member 12, as shown in Figures 1, 2, 3 and 6. This member 12 has been shown in full lines in Figure 6 although it is to be understood that the section line 6—6 does not include such member. It is merely added for the purpose of clearness. This transverse member 12 is provided with an aperture 13 adapted to receive any of the usual conventional extensions of the crank rod, such rod being omitted for clearness.

A rectangular frame is also provided which has its lower ends attached to the longitudinal channel irons. This frame consists of vertical angle irons 14 and horizontal angle irons 15 and 16, as most clearly shown in Figures 3 and 5. These angle irons are adapted to hook over the flanges of the radiator and to thus insure a secure unitary relation between the hoist mechanism and the parts of the tractor.

It is to be noted from Figure 3 that the channel irons 1 are provided with lugs 17 secured adjacent their front ends and that their segmental ends 3 are also provided with lugs 18. These lugs are joined by diagonal tie rods 19 to thus form a triangular bracing structure with the channel irons 1 and increase the strength of the device.

It is to be noted from the construction thus far given that any relative bending of the tractor or slight swaying of its parts is also permitted for the hoist mechanism body portion or frame work, and thus the frame work forms, in essence, a unitary portion of the tractor when it is securely attached thereto, as described.

A pair of bearing standards or blocks, indicated generally at 20, have their bases securely bolted to the upper forward end of the channel irons 1, as shown in Figure 3. These bearing members or blocks are provided with bearings 21 and 22 for the transverse shaft 23 of the winding drum 24. They are also provided with upper apertured portions 25 which receive the upper transverse rod 26 for one of the control members hereinafter described.

It is to be noted from Figures 3 and 6 that one of the bearing members 21 is provided with a reduced portion, as indicated at 27 and with a flange 28. A worm wheel 29 is keyed to the drum shaft 23, as shown in Figure 6, and a worm wheel housing 30 is apertured to receive the reduced portion 27 and is securely bolted to the flange 28. This housing also carries a worm 31 rigidly secured to a jack shaft or a worm shaft 32. This worm shaft 32 extends downwardly and rearwardly, as shown in Figures 1 and 2, and is received at its rear end within a casing 33. It is provided with reversing mechanism which consists of a clutch member 34 loosely splined to the shaft 32 and provided with teeth on its outer face. These teeth are adapted to engage corresponding teeth carried by beveled gears 35 loosely mounted for free rotation upon the shaft 32. These bevel gears mesh with a bevel gear 36 carried by a short stub shaft 37. This stub shaft is adapted to be connected by means of a slidable collar or clutch member 38 with the driving shaft 39 extending outwardly from the tractor, the construction of this portion of the apparatus being in accordance with the disclosure in the copending application for belt pulley clutch control for tractors filed Dec. 13, 1923, by Mueller et al., and bearing Serial No. 680,450, patented July 21, 1925, No. 1,546,857. The reversing sleeve or clutch member 34 is controlled by means of a lever 40 (see Figure 1) which is provided with a clip adapted to seat in any one of three notches formed in a segmental member 41, to thus hold the sleeve 34 in neutral or in either forward or rear position.

A clutch lever 42 (see Figure 1) is also provided for controlling the clutch sleeve 38 in accordance with the disclosure in the above noted application, so that the shaft 32 may be connected or disconnected from the driving shaft 39 of the tractor, and also may be driven in either direction by manipulation of the levers 41 and 42.

It is to be understood that either the apertures in the flange 28 (see Figures 3 and 6) or in the worm wheel casing 30 may be slightly elongated to permit angular adjustment of the shaft 32 to insure correct alignment. For instance, the apertures in the flange 28, as shown in Figure 3, may be slightly elongated.

Referring to Figure 6, it will be seen that the clutch drum is provided with flanges 43 and 44. This clutch drum is loose upon the shaft 23 and is provided with an angular ring 45 preferably formed of wood or other fibrous material and made in sections. This wooden ring is secured by means of headed screws 46 socketed in such ring and threaded into the flange 44. This wooden ring is adapted to frictionally engage within a V-shaped angular groove or channel 47 formed by the outwardly projecting flanges of a disk 48. This disk is securely keyed to the shaft 23. A relatively strong helical spring 49 is positioned between the flange 44 of the drum and the disk 48 and thus urges the drum to the left in Figure 6 tending to open the frictional clutch engagement between the drum and the plate.

Means are provided for sliding the drum 24 to the right in Figure 6 and are interposed between the left hand end thereof and the left hand bearing block 20, as shown in Figure 6. This means comprises a hub 50 provided with an arm 51 which carries at its outer end a segmental slotted member 52, as shown in Figures 6, 7 and 8. The segmental member 52 is clamped against a boss formed on the bearing block 20 as shown in Figures 6 and 7, by means of a bolt 53 and is thus adapted for angular or rocking adjustment. A second hub 54 is positioned between the end of the drum and the hub 50, as shown in Figures 6 and 7. This hub is provided with a manipulating lever or arm 55, whereby it may be rocked, as desired. It is to be noted from reference particularly to Figure 7 that the two hubs 50 and 54 are provided with co-operating ratchet tooth faces or slanting faces 56 so that when the arm 55 of the movable hub is rocked it will slide the winding drum 24 to the right in Figure 6 against the action of the spring 49 and will thus frictionally couple the drum to the shaft by means of the friction clutch mechanism previously described. Also the exact pressure desired may be most easily secured by gauging the rocking motion of the lever 55 and thus the winding drum may be gradually coupled to the shaft 23 without shock or jar.

It is to be noted further from reference to Figures 1, 2 and 6 that the flange 44 of the winding drum is provided with a brake drum 57 which receives the brake band 58, such brake drum being preferably flanged to aid in retaining this band. The brake band is tightened by means of the lever 59 pivotally mounted upon the shaft 26. Such lever is retained in correct position upon the shaft 26 by means of a spacer such as shown at 60 or by forming the shaft of different sizes. It is to be noted further from reference to Figures 2 and 6 that the shaft 23 is provided at one of its outer ends with a winch head or "cat head" 61.

Referring to Figure 1, it will be seen that the lever 55 is controlled by means of a rearwardly extending rod 62 and that the lever 59 is similarly controlled by means of the rearwardly extending rod 63. These rods have their rear ends connected to manually operable levers 64 and 65, respectively, as shown in Figures 1 and 2. Each of the levers is provided with a suitably mounted detent adapted to engage in the ratchet teeth of segmental members 66 to thus temporarily lock the levers in adjusted position.

The segmental members 66 may conveniently be secured to the dash 66' thus positioning the levers within easy reach of the operator.

In operating the device, it is not necessary for the operator to move from his usual seat on the tractor. It is to be noted that the four levers 40, 42, 64 and 65, as shown in Figures 1 and 2, are within easy reach of the operator. When it is desired to lift the load by means of the winding drum 24, it is merely necessary for the operator to throw in the clutch 38 by means of the lever 42 and to secure the correct direction of rotation by means of the lever 40, such lever controlling the connection of the gears 34 and 36. The shaft 23 is now freely rotating within the drum, the drum being held by means of the brake. The operator now manipulates the levers 64 and 65 to gradually close the friction clutch and to gradually release the brake, thus allowing the load to be gradually imposed upon the engine without shock either to the mechanism or to the load.

It is to be particularly noted in this connection that the load is at all times during this transition under the control of the operator and that the required retaining force of the brake or driving force transmitted through the clutch may be exactly proportioned as desired.

When the load arrives at the desired height, it is merely necessary for the operator to again manipulate the levers 64 and 65, as shown in Figures 1 and 2, to thus tighten the brake and release the friction clutch, thus securely holding the load in position.

Obviously, when it is desired to lower the load the operator may lower it by slightly loosening the brake and allowing it to descend under the frictional control of the brake, or else he may connect it with the engine to positively drive the drum and by suitable control of the engine speed to control the speed of the descending load. If at any time while the winding drum is not actively employed, it is desired to use the winch head 61, it may be most easily accomplished by leaving the brake closed and the friction drum open. Rotation of the winch head 61 can be controlled by means of the clutch lever 42 without disturbing the setting of the winding drum 44. Further, the direction of the rotation of the winch head 61 may be easily controlled by means of the reverse lever 40.

It will be seen, therefore, that a very effective hoist attachment for tractors has been provided which permits operation of the hoist without danger of stalling the engine and without shock or jar to either the load or mechanism.

It will be seen further that the mechanism permits the ready use of the winch head in intervals when the drum is not actively in operation, thus materially increasing the usefulness of this device.

A roller bearing or anti-friction bearing 67 (see Figure 6) may be interposed between the hub 54 of the clutch control and the drum 24 to thus decrease the frictional resistance offered the operation of the rocking lever 55.

Therefore, although this invention has been described in considerable detail, it is to be understood that the invention may be variously embodied and is, therefore, to be limited only as claimed.

We claim:

1. A hoist attachment for a tractor having a flanged transmission case and a front axle pivotally joined to a front yoke, said attachment comprising a frame having a pair of side bars located on opposite sides of the tractor body and having their forward ends projecting beyond the front of the tractor, a pair of segmental members carried by the rear ends of said side bars and hooked behind the said flange and bolted thereto, a downwardly extending yoke secured to the forward portion of said side bars and coupled to said front axle at the pivot point of said axle and said first mentioned yoke, a hoisting drum mounted between the projecting portion of said side bars, means for driving said drum from said tractor, and means for holding said drum against rotation.

2. The combination of a tractor having a body portion provided with a flange intermediate its ends and having a front axle and a yoke pivotally connected by a pintle pin, a pair of side frame bars, segmental members secured to the rear portion of said side frame bars and hooked behind and bolted to said flange, a yoke secured to the forward portion of said side frame bars and extending downwardly and pivotally receiving said pintle pin, a hoisting drum supported from said bars, means for driving said drum from said tractor, and a brake for holding said drum against rotation.

3. The combination of a tractor having a body portion provided with a flange intermediate its ends and having a front axle and a yoke pivotally connected by a pintle pin, a pair of side frame bars, segmental members secured to the rear portion of said side frame bars and hooked behind and bolted to said flange, a yoke secured to the forward portion of said side frame bars and extending downwardly and pivotally receiving said pintle pin, a hoisting drum supported from said bars, means for driving said drum from said tractor, a brake for holding said drum against rotation, and a pair of manually operable levers mounted adjacent the rear portion and operatively connected with said brake and the driving means for said drum.

In testimony that we claim the foregoing we have hereunto set our hands at Milwaukee, in the county of Milwaukee and State of Wisconsin.

WILLIAM H. SCHMIDT.
PAUL O. DALLMANN.
THEODORE G. MUELLER.